US009751077B2

(12) United States Patent
Hingorani et al.

(10) Patent No.: US 9,751,077 B2
(45) Date of Patent: Sep. 5, 2017

(54) AIR FILTRATION USING MANGANESE OXIDE

(71) Applicant: Lennox Industries Inc., Richardson, TX (US)

(72) Inventors: Sanjeev Hingorani, Gainesville, FL (US); Henry Greist, Gainesville, FL (US)

(73) Assignee: LENNOX INDUSTRIES INC., Richardson, TX (US)

( * ) Notice: Subject to any disclaimer, the term of this patent is extended or adjusted under 35 U.S.C. 154(b) by 0 days.

(21) Appl. No.: 15/090,725

(22) Filed: Apr. 5, 2016

(65) Prior Publication Data

US 2016/0214085 A1 Jul. 28, 2016

Related U.S. Application Data

(63) Continuation of application No. 14/498,531, filed on Sep. 26, 2014, now Pat. No. 9,333,488.

(60) Provisional application No. 61/884,627, filed on Sep. 30, 2013.

(51) Int. Cl.
| | |
|---|---|
| *A62B 7/08* | (2006.01) |
| *B01D 50/00* | (2006.01) |
| *B01D 47/00* | (2006.01) |
| *B01D 53/02* | (2006.01) |
| *B01J 23/34* | (2006.01) |
| *F02M 35/024* | (2006.01) |
| *B01D 53/88* | (2006.01) |
| *B01D 53/86* | (2006.01) |

(52) U.S. Cl.
CPC ......... *B01J 23/34* (2013.01); *B01D 53/8668* (2013.01); *B01D 53/8675* (2013.01); *B01D 53/885* (2013.01); *F02M 35/02441* (2013.01); *B01D 2253/102* (2013.01); *B01D 2253/104* (2013.01); *B01D 2253/108* (2013.01); *B01D 2253/206* (2013.01); *B01D 2255/2073* (2013.01); *B01D 2255/2092* (2013.01); *B01D 2255/20707* (2013.01); *B01D 2255/50* (2013.01); *B01D 2255/702* (2013.01); *B01D 2257/106* (2013.01); *B01D 2257/2045* (2013.01); *B01D 2257/2047* (2013.01); *B01D 2257/302* (2013.01); *B01D 2257/704* (2013.01); *B01D 2257/708* (2013.01); *B01D 2258/06* (2013.01); *B01D 2259/4508* (2013.01); *B01D 2259/4566* (2013.01)

(58) Field of Classification Search
CPC .... A61L 9/00; A61L 9/014; F02C 7/05; F24F 13/28
USPC ............. 422/122, 311; 55/315, 342; 95/234, 95/286–287; 96/121, 134
See application file for complete search history.

(56) References Cited

U.S. PATENT DOCUMENTS

| | | | |
|---|---|---|---|
| 9,333,488 B2 * | 5/2016 | Hingorani | ............... B01J 23/34 |
| 2009/0001012 A1 * | 1/2009 | Kepner | ................. A01N 25/34 |
| | | | 210/287 |

* cited by examiner

*Primary Examiner* — Monzer R Chorbaji (57) ABSTRACT

In various implementations, a filter may include a substrate and manganese oxide coupled to the substrate. The filter may at least remove particles and/or chemicals from a gaseous stream. In some implementations, the filter may be capable of degrading at least one of formaldehyde or ozone present in a gaseous stream.

20 Claims, 4 Drawing Sheets

AIR FILTRATION USING MANGANESE OXIDE

CROSS-REFERENCE TO RELATED APPLICATION

This application is a continuation of U.S. patent application Ser. No. 14/498,531 entitled "Air Filtration Using Manganese Oxide", filed on Sep. 26, 2014, which claims priority to U.S. Provisional Patent Application No. 61/884,627, entitled "Air Filtration Using Manganese Oxide," filed on Sep. 30, 2013, which is hereby incorporated by reference for all purposes.

TECHNICAL FIELD

The present disclosure relates to air filtration.

BACKGROUND

Air filters may be used to remove contaminants, such as solid particulate matter, from air. The air filters may be cleanable and/or disposable. The air filters may be used in applications such as cars, air conditioners, industrial settings, and/or other applications.

SUMMARY

In various implementations, a filter may include a substrate and manganese oxide coupled to the substrate. The filter may at least partially remove particles and/or predetermined chemicals from a gaseous stream. In some implementations, the filter may be capable of removing at least a portion of aldehyde(s) (e.g., formaldehyde and/or acetaldehyde), ozone, inorganic acid(s), alcohol(s), and/or ketone(s) present in a gaseous stream.

In various implementations, a filter may include a first substrate and manganese oxide(s). The first substrate may include pores through which a gaseous stream may at least partially pass. The first substrate may include a first side and an opposing second side. The gaseous stream passing at least partially through the first substrate may contact at least a portion of the first side prior to contacting the opposing second side. The manganese oxide(s) may be coupled to the opposing second side of the first substrate. The filter may remove at least a portion of one or more predetermined compounds from the gaseous stream at temperatures less than approximately 125 degrees Fahrenheit.

Implementations may include one or more of the following features. The filter may remove at least a portion of one or more predetermined compounds from the gaseous stream at temperatures greater than approximately 0 degrees Fahrenheit. For example, removing at least a portion of the predetermined compound(s) in a gaseous stream may include degrading the predetermined compound(s) (e.g., via manganese oxide(s) operating as a catalyst). The filter may allow the degradation at temperatures less than 125 degrees Fahrenheit and/or greater than 0 degrees Fahrenheit. In some implementations, at least one of the manganese oxides may include manganese (II) oxide, manganese dioxide, and/or manganese (III) oxide. The filter may include other compound(s) combined with at least one of the manganese oxides. For example, other compounds combined with manganese oxide(s) may include an activated carbon, a zeolite, a titanium oxide, and/or an aluminum oxide. The filter may remove particles less than a predetermined size (e.g., via macropores with diameters greater than approximately 50 nm, mesopores with diameters of approximately 2 nm to approximately 50 nm, and/or micropores with diameters less than approximately 2 nm) from a gaseous stream passing at least partially through the filter. The predetermined compounds removed from gaseous streams by the filter may include ozone or formaldehyde. The filter may degrade ozone and/or formaldehyde to remove at least a portion of one or more of the predetermined compounds from the gaseous stream. In some implementations, the predetermined compounds may include at least one of an aldehyde, ozone, an inorganic acid, an alcohol, and/or a ketone. In some implementations, the filter may include a second substrate. The second substrate may be coupled to the first substrate and/or coupled to the first side of the first substrate.

In various implementations, a filter system may include two or more substrates and manganese oxide(s). The two or more substrates may include pores through which a gaseous stream may at least partially pass. The filter system may include a first substrate and a second substrate. Manganese oxide(s) may be disposed between the first substrate and the second substrate. The filter system may remove one or more predetermined compounds (e.g., aldehydes such as formaldehyde, ketones, alcohols, ozone, etc.) from a gaseous stream at temperatures less than approximately 125 degrees Fahrenheit.

Implementations may include one or more of the following features. One or more of the manganese oxides may be coupled to a third substrate. The third substrate may be disposed between the first substrate and the second substrate. In some implementations, the third substrate may be coupled to the first substrate and/or the second substrate. The third substrate may include a polymer film. The first substrate may include a first side and an opposing second side. At least one of the manganese oxides may be coupled to the opposing second side of the first substrate. The gaseous stream passing at least partially through a filter system may contact at least a portion of the first side prior to contacting the opposing second side of the first substrate. The substrates may include a pleated substrate, a metal honeycomb, fibers, ceramic, quartz, polymer film, paper, and/or cotton. In some implementations, the filter system may include one or more additional substrates coupled to the first substrate and/or the second substrate. The filter system may remove at least a portion of one or more predetermined compounds from the gaseous stream at temperatures greater than Q degrees Fahrenheit and less than approximately 125 degrees Fahrenheit.

In various implementations, a method of filtering one or more gaseous streams may include allowing a gaseous stream with a temperature greater than 0 degrees Fahrenheit and less than approximately 125 degrees Fahrenheit to pass through a filter. The filter may include substrates and manganese oxide(s). The substrate(s) may include pores through which the gaseous stream may at least partially pass. A first substrate of the substrate(s) may include a first side and an opposing second side. The gaseous stream passing at least partially through the first substrate may contact at least a portion of the first side prior to contacting the opposing second side. The manganese oxide(s) may be coupled to the second side of the first substrate. At least a portion of one or more predetermined compounds may be removed from the gaseous stream as the gaseous stream passes at least partially through the filter.

Implementations may include one or more of the following features. Removing at least a portion of the predetermined compound(s) (e.g., aldehydes, ketones, alcohols, and/or ozone) from the gaseous stream may include degrading at least a portion of the predetermined compound(s) in the gaseous stream. Degrading at least a portion of the predetermined compound(s) in the gaseous stream may be performed at temperatures less than approximately 125 degrees Fahrenheit and/or above 0 degrees Fahrenheit (e.g., room temperature). The predetermined compounds may include formaldehyde and/or ozone. Removing at least a portion of the predetermined compounds from the gaseous stream may include degrading at least one of formaldehyde and/or ozone.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Gas filters, such as air filters, may remove particles (e.g., pollen, dust mites, sand, mold, spores, animal dander, dust, bacterial, smoke, paint pigments, and/or virus) and/or predetermined chemicals (e.g., ozone and/or formaldehyde) from a gaseous stream. Gas filters may remove at least a portion of the particles and/or chemicals in a gaseous stream in applications, such as air conditioners, air purifiers, etc.

A gas filter may remove at least a portion of the particles and/or chemicals in a gas stream by blocking the passage of particles and/or chemicals through the gas filter. A gas filter may degrade and/or promote the degradation (e.g., by acting as a catalyst or participating in degradation) of the particles and/or chemicals in a gas stream. The type of chemical that can be removed from a gas stream may be predetermined based on the type of compounds (e.g., manganese oxide) selected for inclusion in the gas filter. Gas filters may be classified using ratings (e.g., industry ratings, government ratings, company ratings, etc.) based on the type and/or size of particle(s) and/or predetermined chemicals that may be removed from a gas stream. For example, a gas filter may include a MERV (minimum efficiency reporting value). In some implementations, the components of the gas filter may be selected to satisfy a MERV (Minimum efficiency reporting value) rating requested by government, industry, company, and/or other standards.

A gas filter may include components, such as a substrate and manganese oxide coupled to the substrate. In some implementations, a substrate may include a metal honeycomb. The substrate may include fibers, such as fiberglass fibers, polymer fibers, and/or carbon fibers. The substrate may include ceramic, quartz, paper, and/or cotton.

The substrate may have a planar shape, a pleated shape, and/or any other appropriate shape. In some implementations, the substrate may be at least partially planar. For example, the substrate may include a sheet of paper and/or thin polymer film. In some implementations, the substrate may include accordion folded paper.

The substrate may include pores, through which a gas stream may flow. The materials included in the substrate may be disposed to form pores (e.g., fibers may be arranged to form pores). The pores of the material may sized based on the filtration needs of a specific application (e.g., home filtration; clean room filtration; MERV rating required by government, industry and/or company standards; etc.). For example, a metal honeycomb may be utilized to capture nanoparticles from a gas stream. As another example, polymer and/or fiberglass fibers may be included in a substrate for a gas filter used in a residential air conditioning system.

The materials included in the substrate may be selected to not substantially deform and/or degrade in the operation temperatures. For example, the gas filters may be utilized in room temperature (e.g., less than approximately 125 degrees Fahrenheit and/or greater than approximately 0 degrees Fahrenheit). The material(s) included in the substrate may not substantially degrade and/or deform at room temperature when used in air conditioners, for example.

The substrate may be capable of physical separation. For example, particles and/or chemicals larger than the pores of the substrate may be retained by the substrate and/or at least partially blocked from passing through the substrate. The substrate may include characteristics (e.g., pore size, number of pores, wet strength, flow rate, etc.) that affect the ability of the substrate to physically and/or chemically remove particles and/or chemicals from a gas stream.

The substrate may be capable of chemical separation and/or degradation (e.g., promotion of degradation). For example, the substrate may include one or more portions capability of absorbing, chemically attracting, and/or otherwise coupling with one or more compounds (e.g., ion exchange resins, activated carbon). In some implementations, the substrate may be embedded and/or otherwise impregnated with one or more materials to facilitate physical separations, chemical separations, and/or degradation of predetermined chemicals. The substrate may be inert (e.g., at least one of the materials that is included in the substrate does not promote chemical degradation). In some implementations, although a material that is included in the substrate is inert, a component (e.g., manganese oxide) coupled to the substrate may not be inert and may promote degradation of predetermined chemicals and/or chemical separation.

The filter may also include manganese oxide to facilitate degradation of one or more compounds. The manganese oxide may include manganese (II) oxide, manganese dioxide, and/or manganese (III) oxide. The manganese oxide may be in granular form, particle form, nanoparticle form, included in nanoparticles, and/or other form. The manganese oxide may be combined (e.g., mixed, bonded, etc.) with one or more other compounds (e.g., binders, encapsulators, catalysts, and/or other compounds). For example, the manganese oxide may be combined with titanium oxide(s) and/or aluminum oxide(s).

The manganese oxide may be a catalyst. For example, the manganese oxide may promote and/or participate in the degradation of one or more compounds in the gas stream. In some implementations, a gas stream, such as air may include formaldehyde and/or ozone. Formaldehyde may be present in the air due industrial contamination, seepage from products such as furniture, and/or other sources. Since formaldehyde is described as a known carcinogen by regulatory agencies, such as the National Toxicology Program, removal of at least a portion of the formaldehyde from a gas stream such as air may improve the quality (e.g., odor and/or toxicity) of the air.

The manganese oxide may act as a catalyst in the degradation of formaldehyde. For example:

$$Mn_xO_y + CH_2O \rightarrow Mn_xO_{y-1} + 2H + CO_2; \text{ and}$$

$$Mn_xO_{y-1} + 2H + O_2 \rightarrow MnO_xO_y + H_2O;$$

where x=1-2 and y=1-3.

Thus, the manganese oxide may act as a catalyst in the degradation of formaldehyde to water and carbon dioxide. By including manganese oxide(s) coupled to a substrate as a gas filter, the degradation of formaldehyde may be promoted (e.g., via the manganese oxide catalyst); and thus, at least a portion of formaldehyde present in a gas stream may be removed.

In some implementations, a gas stream may include compounds, such as ozone. Ozone may be present in the air due to industrial contamination, natural presence in air, and/or from other sources. Since ozone may be described as an irritant by regulatory agencies, for example, removal of at least a portion of the ozone in a gas stream, such as air, may improve the quality (e.g., odor and/or toxicity) of the air.

Manganese oxide may act as a catalyst in the degradation of other compounds, such as ozone. For example:

$$2O_3 \rightarrow 3O_2, \text{ in the presence of } MnO_xO_y, \text{ where } x=1-2 \text{ and } y=1-3.$$

Thus, manganese oxide may act as a catalyst in the ozone degradation to oxygen. By including manganese oxide coupled to the substrate as a gas filter, the degradation of ozone may be promoted; and thus, at least a portion of the ozone present in a gas stream may be removed.

In some implementations, manganese oxide in the filter may be capable of degrading compounds, such as aldehydes (e.g., formaldehyde and/or acetaldehyde), inorganic acids (e.g., inorganic acids including chlorine, fluorine, and/or sulfur dioxide, such as hydrochloric acid, hydrofluoric acid, and/or sulfuric acid), alcohols, and/or ketones.

By utilizing a filter that includes manganese oxide coupled to a substrate, the catalytic properties of the manganese oxide may be utilized at room temperature in improving the quality of the air (e.g., when compared to a quality of the air prior to entering the filter). In some implementation, since a gas filter used in an air conditioner will filter air at a temperature proximate room temperature (e.g., less than 125 degrees Fahrenheit and/or greater than 0 degrees Fahrenheit). For example, room temperature may include ambient temperature plus or minus the cooling and/or heating capacity of a device (e.g., air conditioner and/or air purifier). A catalyst that operates at room temperatures and pressures may be utilized with the gas filter, in some implementations (e.g., if a catalyst needs substantially higher and/or substantially cooler temperatures to promote degradation, then the cost to achieve the degradation may be increased and/or user satisfaction may be decreased since the air temperature may be cooled and/or heated to aid degradation).

Figure 1A:
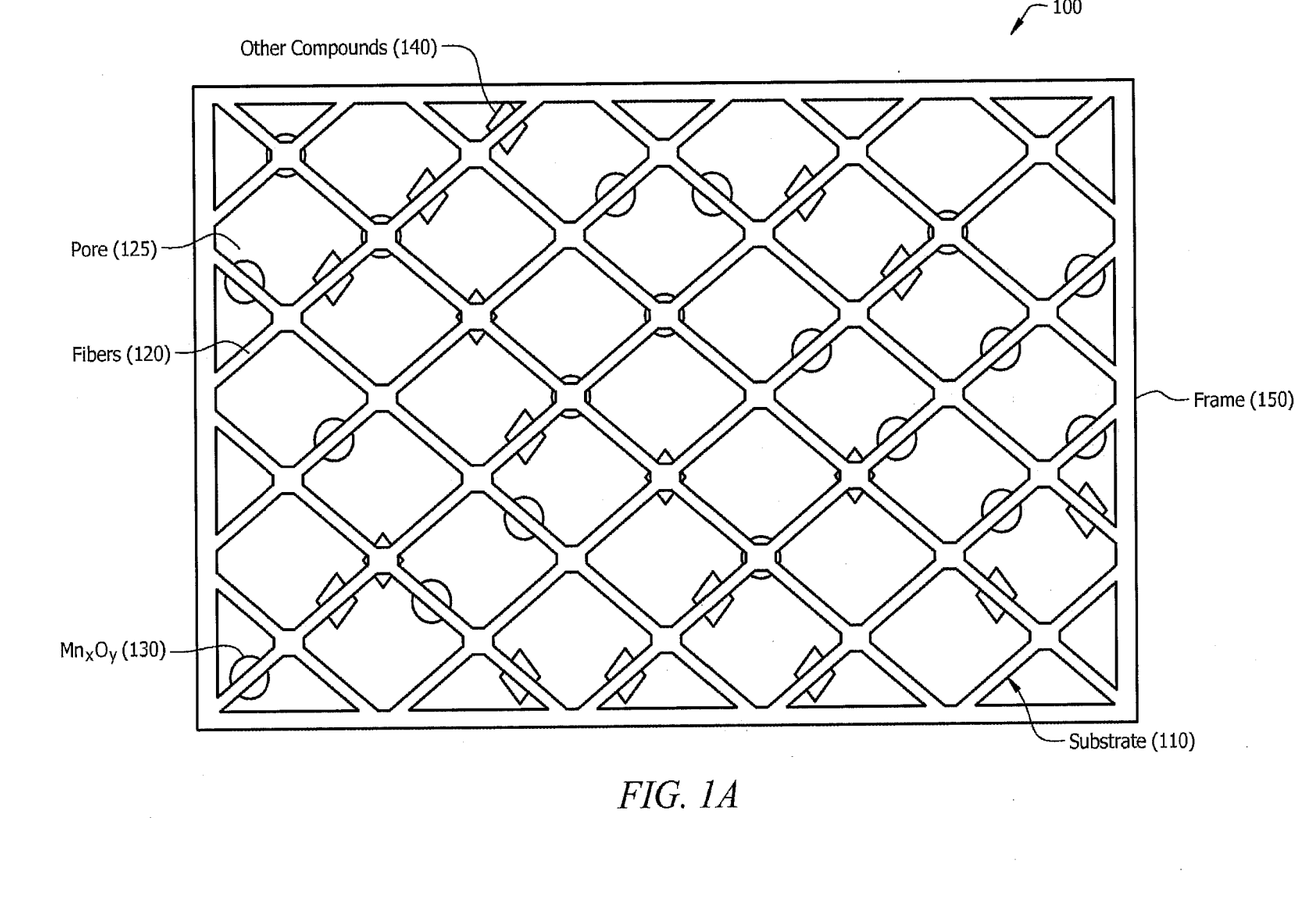
FIG. 1A illustrates an implementation of an example filter.

In various implementations, manganese oxide(s) may be coupled to the substrate. For example, the manganese oxide(s) may be embedded, coated, affixed, bonded, and/or otherwise coupled, as appropriate. FIG. 1A illustrates an implementation of an example filter 100. As illustrated, the filter 100 includes a substrate 110. The substrate 110 may include fiberglass fibers 120. The fibers 120 may be disposed in the substrate 110 such that the substrate includes pores 125. Manganese oxide 130 may be coated on at least a portion of one or more of the fibers 120 of the substrate 110. As illustrated, other compounds 140 may be coupled to at least a portion of one or more of the fibers 120 of the substrate 110. The other compounds may include compounds for physical and/or chemical separations of compounds from a gas stream. For example, the other compounds 140 may include activated carbon, zeolites, and/or other compounds, as appropriate. The filter may include a frame 150 to which the substrate is coupled. The frame 150 may facilitate placement of the filter in an environment (e.g., air conditioning systems, heat pumps, ventilation hoods, and/or air purifier). The frame 150 may increase the rigidity of the filter 100. For example, the frame may include a cardboard, metal (e.g., aluminum), plastic, and/or a wood frame.

Although a specific implementation of a filter is illustrated in FIG. 1A, other variations may be utilized, as appropriate. For example, the frame may be a portion of the substrate or a different part of the filter. The frame may couple to one or more edges of the substrate. In some implementations, the fibers of the substrate may be embedded with manganese oxide. The substrate may not include fibers. The substrate may include a metal structure with pores, such as a metal honeycomb structure. The substrate may include paper, in some implementations. In some implementations, the filter may not include other compounds. In some implementations, the substrate may include a high efficiency filter. In some implementations, the manganese oxide and/or one or more other compounds may be coated on a downstream portion of the filter. For example, the manganese oxide may be coated on a first side of the filter. The second opposing side of the filter may contact a gas stream drawn across a filter prior to the first side of the filter. By allowing the manganese oxide and/or other compounds to be coupled to a downstream portion of the filter, the effective life of the manganese oxide and/or other compounds (e.g., the time period during which the manganese oxide and/or other compounds adhere to the substrate and/or is able to degrade one or more predetermined compounds) may be increased. In some implementations, by coupling the manganese oxide and/or other compounds to a downstream portion of the filter, dust and/or other particles from a gas stream drawn across the filter may not coat and/or at least partially cover the manganese oxide and/or other compounds. Coating (e.g., fouling of the filter) of the manganese oxide and/or other compounds by particles may interfere with the degradation abilities of the manganese oxide and/or other compounds since the particles may block interaction of the manganese oxide and/or other compounds with the gas stream.

In some implementations, the manganese oxide may be coupled to the substrate by coating the substrate with manganese oxide. For example, the fibers of a substrate (e.g., a high efficiency medium) may be directly coated. Coating the manganese oxide may include utilizing a binder to couple the manganese oxide to the substrate. In some implementations, a thermal process may be utilized to inhibit release of the manganese oxide from the substrate. The coating technique(s) may be selected to satisfy operational parameters (e.g., use in room temperature, use for a predetermined period of time such as 3 months, and/or use in a predetermined pressure).

In some implementations, the manganese oxide may be coupled to a first layer and the first layer may be coupled (e.g., bonded) to the substrate.

Figure 1B:
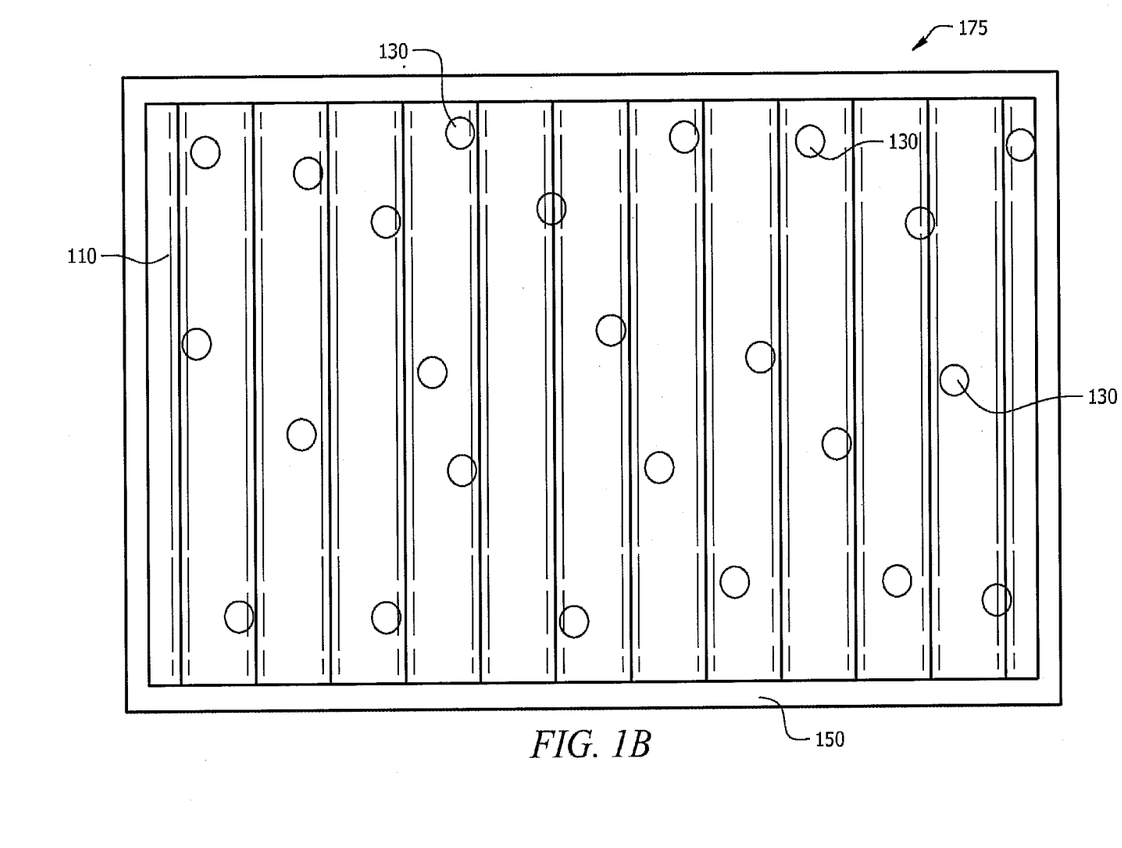
FIG. 1B illustrates an implementation of an example filter.

In some implementations, the substrate may include a pleated medium. FIG. 1B illustrates an implementation of an example filter 175. As illustrated, the filter 175 includes a substrate 110 and a frame 150 to which the substrate is coupled. The substrate 110 includes a pleated medium. For example, the substrate 110 may include an accordion pleated paper filter. The manganese oxide 130 may be coated and/or otherwise coupled on portions of the substrate 110. As illustrated, the manganese oxide 130 may be coated on various portions of the pleats of the substrate 110.

Although a specific implementation of a filter is illustrated in FIG. 1A, other variations may be utilized as appropriate. For example, the filter may include more than one substrate. The filter may include other compounds coupled to the substrate. The frame may be a portion of the substrate. The pleated medium may include fibers coupled to the pleated medium and/or forming the pleated medium. In some implementations, the manganese oxide may be embedded in a thin film coupled to the pleated substrate.

During use of the filter, such as the filter described in FIG. 1A and/or FIG. 1B, the filter may be disposed in a device, for example, in an air conditioning system and/or an air purifier. A gas stream, such as air may be blown and/or drawn across a filter by a blower, for example. At least a portion of the air may contact one or more portions of the substrate, manganese oxide, and/or other compounds. As the air or portions thereof contact the manganese oxide, the manganese oxide may catalytically promote one or more degradation processes of one or more of types of chemicals, such as one or more aldehydes such as formaldehyde, ozone, one or more inorganic acids, one or more alcohols, and/or one or more ketones. The type of chemical(s) that may be degraded by the filter may be predetermined by the compounds (e.g., manganese oxide, activated carbon, and/or zeolite) coupled to a substrate of the filter. As air or portions thereof contact the other compounds, components of the air (e.g., particles and/or chemicals) may be chemically and/or physically separated from the air. At least a portion of the air may be able to pass through the pores of the substrate, in some implementations. The quality of the air may be improved (e.g., compared with unfiltered air).

Figure 2:
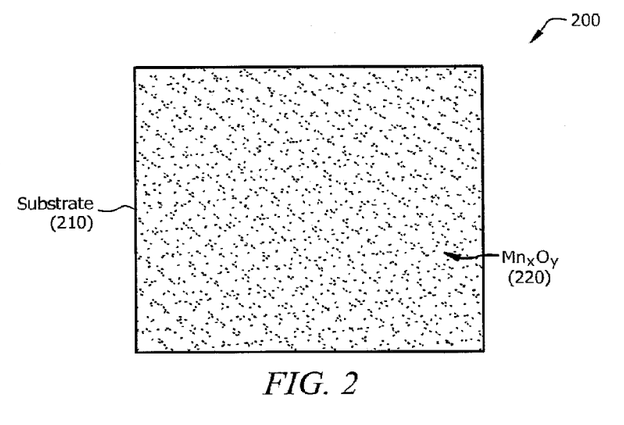
FIG. 2 illustrates an implementation of an example filter.

FIG. 2 illustrates an implementation of an example filter 200. As illustrated, the filter 200 may include a substrate 210. The substrate 210 may not include a frame. The substrate 210 may include pores at a predetermined size. For example, the pore size may be selected to obtain a specified MERV rating. The pore size may be selected to remove a predetermined listing of particles and/or chemicals. The substrate 210 may include a sheet, such as membrane, paper, and/or other thin film. The manganese oxide 220 may be coupled to the sheet of the substrate 210. For example, at least a portion of the sheet 210 may include a tackiness that couples to the manganese oxide 220. The manganese oxide may be coated in a regular or irregular pattern. For example, the manganese oxide may be sprayed onto a tacky substrate in an irregular pattern. In some implementations, the manganese oxide 220 may be embedded in the sheet 210.

Although a specific implementation of a filter is illustrated in FIG. 2, other variations may be utilized, as appropriate. For example, the filter may include other compounds. The filter may include fibers. In some implementations, the manganese oxide may be coupled to a surface of the substrate.

Figure 3:
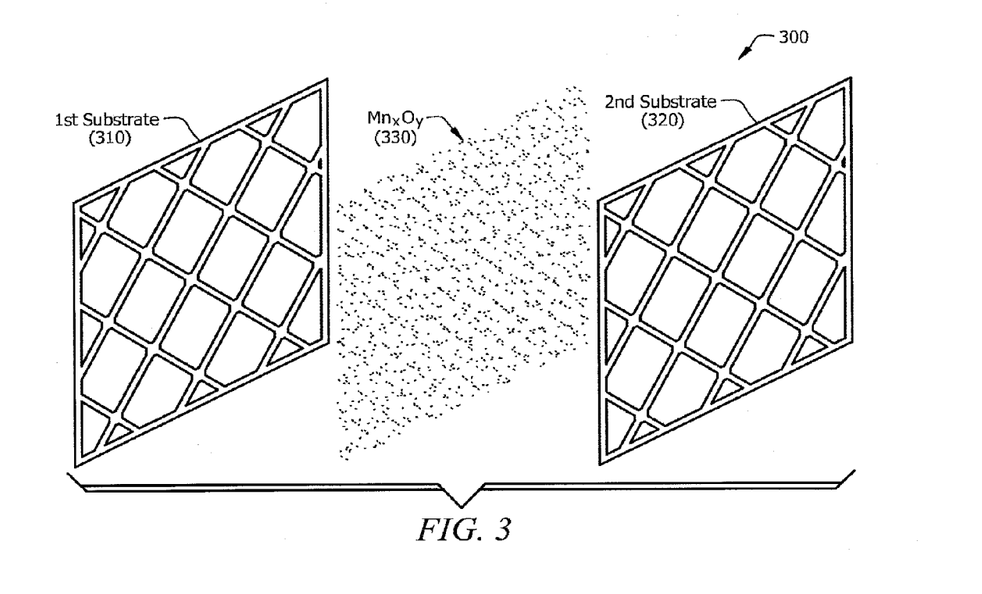
FIG. 3 illustrates an exploded view of an implementation of an example filter.

FIG. 3 illustrates an exploded view of an implementation of an example filter 300. As illustrated the filter 300 may include a first substrate 310 and at least one second substrate 320. As illustrated, manganese oxide 330 may be disposed between the first substrate 310 and the second substrate 320. For example, the manganese oxide 320 may be a powder that is dispersed between two layers of substrate (e.g., first substrate 310 and second substrate 320). The manganese oxide may be coupled to one of the substrates and/or coupled between two substrates.

Although a specific implementation of a filter is illustrated in FIG. 3, other variations may be utilized, as, appropriate. In some implementations, the manganese oxide may be disposed on a third substrate. For example, the third substrate may be a webbing. The third substrate may be disposed between the first substrate 310 and the second substrate 320. One or more of the substrates may be coupled (e.g., to each other and/or to a frame).

Figure 4:
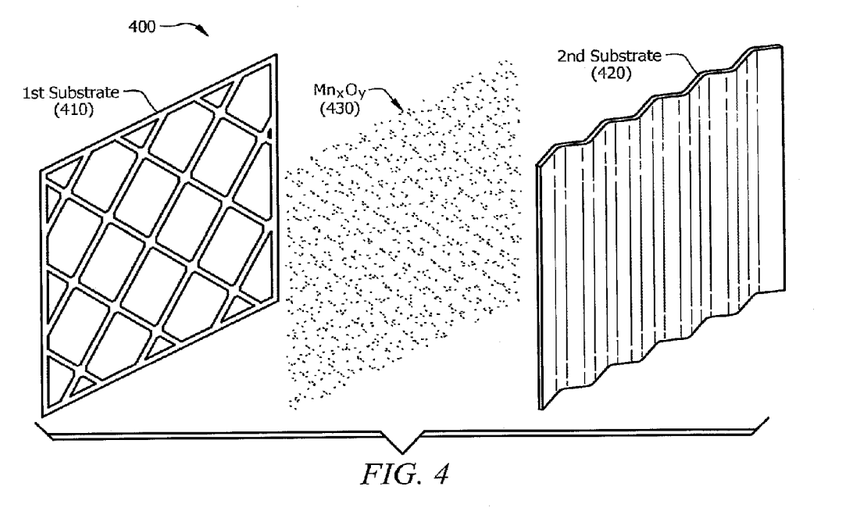
FIG. 4 illustrates an exploded view of an implementation of an example filter; and Like reference symbols in the various drawings indicate like elements.

FIG. 4 illustrates an exploded view of an implementation of an example filter 400. As illustrated the filter 400 may include a first substrate 410 and at least one second substrate 420. As illustrated, the first substrate 410 may include a substrate with fibers (e.g., a metal honeycomb and/or fiberglass fibers) and the second substrate 420 may include a pleated substrate. The pleated substrate may include a pleated paper and/or fiberglass substrate. As illustrated, manganese oxide 330 may be disposed between the first substrate 310 and the second substrate 320. The manganese oxide 330 may be coupled to one of the substrates and/or coupled between two substrates. For example, the manganese oxide 330 may be coated to the first substrate.

Although a specific implementation of a filter is illustrated in FIG. 4, other variations may be utilized, as appropriate. For example, the first substrate may be a pleated substrate. In some implementations, the manganese oxide may be disposed on a third substrate. For example, the third substrate may be a thin polymer film. The third substrate may be disposed between the first substrate 310 and the second substrate 320. One or more of the substrates may be coupled (e.g., to each other and/or to a frame). During use, air drawn across the filter may contact the first substrate prior to the second substrate. In some implementations, air drawn across the filter may contact the second substrate prior to the first substrate. The substrates in the filter may be ordered to improve filtration properties (e.g., when compared with other substrate orders). For example, dust and/or other particles may be removed from a gas stream by the first substrate. Thus, dust may be inhibited from at least partially coating the manganese oxide.

In some implementations, a filter may include a first substrate and one or more additional substrates. A first substrate may include manganese oxide coupled to at least a portion of the substrate. For example, the first substrate may include a porous metal substrate with manganese oxide coupled to portions of the metal substrate. The filter may include one or more additional substrates. For example, additional substrates may include photo absorptive filter, particle filter, chemical filter, and/or other types of filters as appropriate. The first substrate may be disposed proximate the second substrate such that during use, a gas stream may at least partially pass through the pores of the first substrate and the second substrate. For example, a gas stream may first at least partially contact a first substrate and the manganese oxide on the first substrate may promote formaldehyde and/or ozone degradation. Then, the portion of the gas stream that passes through the first substrate may contact at least a portion of one or of the second substrates. At least one of the second substrates may remove one or more particles and/or chemicals, in some implementations. At least one of the second substrates may be photoabsorptive, in some implementations. Thus, the first substrate may be combined with one or more additional substrates in the filter to increase the quality (e.g., based on quantitative measures, such as ratings including MERV ratings) of the gas stream that passes through the filter.

In some implementations, the substrate to which the manganese oxide is coupled may not cause a substantially pressure drop in the gas stream. The substrate to which the manganese oxide is coupled may cause a pressure drop in the gas stream, in some implementations.

In some implementations, the substrate may include a thin film that may be coupled (e.g., bonded or otherwise affixed) to another existing filter. For example, the substrate with a manganese oxide coupled to the substrate may be applied to an existing filter. The substrate with coupled manganese oxide may be tacky and may be bonded or otherwise coupled to the existing gas filter, in some implementations. The substrate may provide additional gas stream quality improvement (e.g., via promotion of degradation of one or more compounds), when compared to using the existing filter without the substrate.

In various implementations, a filter may be positioned in a system, such as an air conditioning system and/or ventilation system. A blower may generate a gas (e.g., air) flow. The gas flow may be allowed to flow to the inlet of the filter. The gas flow may contact at least a portion of the filter. If the gas flow includes formaldehyde and/or ozone, degradation of at least a portion of the formaldehyde and/or at least a portion of the ozone may be promoted by manganese oxide coupled to a substrate of the filter. At least a portion of the gas flow may be allowed to pass through pores of the filter. In some implementations, one or more particulates and/or other predetermined chemicals may be removed from the gas stream. The quality of the gas that passes through the pores of the filter may be improved (e.g., less particulate and/or less of the chemicals when compared with gas flow at the inlet of the filter).

In various implementations, the manganese oxide(s) may be coupled to the substrate of a filter such that a substantial portion of the manganese oxide(s) remains coupled to the substrate during use. For example, rather than utilizing a weak tackifier to couple the manganese oxide(s) to the substrate, which may allow the manganese oxide particles to flow off the substrate when a gas stream is allowed to flow through the filter, an adhesive, bonding agent, or other coupling mechanism that is strong enough to allow a substantial portion of the manganese oxide coupled to the substrate to remain coupled to the substrate may be utilized.

Various described processes may be implemented by various described systems. In addition, various operations may be added, deleted, and/or modified. In some implementations, one or more of the described process may be performed in combination with other processes and/or operations of processes.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a manganese oxide" includes a combination of two or more manganese oxides; and, reference to "a substrate" includes different types and/or combinations of substrates. As another example, "coupling" includes direct and/or indirect coupling of members.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A filter comprising:
a first substrate comprising pores through which a gaseous stream may at least partially pass, wherein the first substrate comprises:
a first side; and
an opposing second side;
wherein the gaseous stream passing at least partially through the first substrate contacts at least a portion of the first side prior to contacting the opposing second side; and
one or more manganese oxides coupled to the second side of the first substrate,
wherein the one or more manganese oxides comprises at least one powdered manganese oxide;
wherein the filter is adapted to remove at least a portion of one or more predetermined compounds from the gaseous stream by degrading the one or more predetermined compounds.

2. The filter of claim 1, wherein at least one of the manganese oxides comprises manganese (II) oxide, manganese dioxide, or manganese (III) oxide.

3. The filter of claim 1, further comprising one or more other compounds combined with at least one of the manganese oxides.

4. The filter of claim 3, wherein one or more of the other compounds comprises at least one of an activated carbon, a zeolite, a titanium oxide, or an aluminum oxide.

5. The filter of claim 1, wherein the filter is further adapted to remove particles less than a predetermined size from the gaseous stream.

6. The filter of claim 1:
wherein one or more of the predetermined compounds comprises at least one of ozone or formaldehyde; and
wherein the filter degrades at least one of ozone or formaldehyde to remove at least a portion of one or more of the predetermined compounds from the gaseous stream.

7. The filter of claim 1, wherein one or more of the predetermined compounds comprises at least one of an aldehyde, ozone, an inorganic acid, an alcohol, or a ketone.

8. The filter of claim 1, further comprising a second substrate coupled to the first side of the first substrate.

9. The filter of claim 1, further comprising at least one additional substrate coupled to the first substrate.

10. A filter system comprising:
two or more substrates comprising pores through which a gaseous stream may at least partially pass, wherein at least two of the substrates comprise:
a first substrate; and
a second substrate; and
one or more manganese oxides disposed between the first substrate and the second substrate, wherein the one or more manganese oxides comprises at least one powdered manganese oxide;
wherein the filter system is adapted to remove one or more predetermined compounds from the gaseous stream by degrading the one or more predetermined compounds.

11. The filter system of claim 10, wherein one or more of the manganese oxides is coupled to a third substrate, and wherein the third substrate is disposed between the first substrate and the second substrate.

12. The filter system of claim 11, wherein the third substrate comprises a polymer film.

13. The filter system of claim 10, wherein the first substrate comprises:
a first side; and
an opposing second side;
wherein at least one of the manganese oxides is coupled to the opposing second side of the first substrate; and
wherein the gaseous stream passing at least partially through the first substrate contacts at least a portion of the first side prior to contacting the opposing second side.

14. The filter system of claim 10, wherein one or more of the substrates comprises at least one of a pleated substrate, a metal honeycomb, fibers, ceramic, quartz, polymer film, paper, or cotton.

15. The filter system of claim 10, further comprising one or more additional substrates coupled to at least one of the first substrate or the second substrate.

16. The filter system of claim 10, wherein the filter system is further adapted to remove at least a portion of one or more predetermined compounds from the gaseous stream at temperatures greater than 0 degrees Fahrenheit and less than approximately 125 degrees Fahrenheit.

17. A method of filtering one or more gaseous streams, the method comprising:
allowing a gaseous stream with a temperature greater than 0 degrees Fahrenheit and less than approximately 125 degrees Fahrenheit to at least partially pass through a filter; wherein the filter comprises:
one or more substrates comprising pores through which the gaseous stream may at least partially pass;
wherein at least one of the substrates comprise a first substrate;
wherein the first substrate comprises a first side and an opposing second side; wherein the gaseous stream passing at least partially through the filter contacts at least a portion of the first side prior to contacting the opposing second side; and
one or more manganese oxides coupled to the second side of at least one of the first substrates, wherein the one or more manganese oxides comprises at least one powdered manganese oxide; and
removing at least a portion of one or more predetermined compounds from the gaseous stream by degrading the one or more predetermined compounds as the gaseous stream passes at least partially through the filter.

18. The method of claim 17, wherein removing at least a portion of one or more of the predetermined compounds from the gaseous stream comprises degrading at least a portion of one or more of the predetermined compounds in the gaseous stream.

19. The method of claim 17, wherein one or more of the predetermined compounds comprises at least one of formaldehyde or ozone.

20. The method of claim 19, wherein removing at least a portion of one or more of the predetermined compounds from the gaseous stream comprises degrading at least one of formaldehyde or ozone.

* * * * *